(12) United States Patent
Sullivan et al.

(10) Patent No.: US 6,245,859 B1
(45) Date of Patent: Jun. 12, 2001

(54) LOW SPIN GOLF BALL HAVING A DUAL CORE CONFIGURATION

(75) Inventors: Michael J. Sullivan, Chicopee; R. Dennis Nesbitt, Westfield, both of MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/234,275

(22) Filed: Jan. 19, 1999

Related U.S. Application Data

(63) Continuation-in-part of application No. 09/102,342, filed on Jun. 22, 1998, which is a continuation-in-part of application No. 08/716,016, filed on Sep. 16, 1996, now Pat. No. 5,820,489, which is a division of application No. 08/255,442, filed on Jun. 8, 1994, now abandoned, which is a continuation of application No. 08/054,406, filed on Apr. 28, 1993, now Pat. No. 5,368,304, application No. 09/234,375, which is a continuation-in-part of application No. 09/048,701, filed on Mar. 28, 1998, and a continuation-in-part of application No. 09/049,410, filed on Mar. 27, 1998, now Pat. No. 6,057,403, which is a continuation-in-part of application No. 08/926,872, filed on Sep. 10, 1997, which is a division of application No. 08/631,613, filed on Apr. 10, 1996, now Pat. No. 5,803,831, which is a continuation-in-part of application No. 08/591,046, filed on Jan. 25, 1996, now abandoned, and application No. 08/542,793, filed on Oct. 13, 1995, now abandoned, which is a continuation-in-part of application No. 08/070,510, filed on Jun. 1, 1993, now abandoned, application No. 09/234,375, which is a continuation-in-part of application No. 08/870,585, filed on Jun. 6, 1997, which is a continuation of application No. 08/556,237, filed on Nov. 9, 1995, now abandoned, which is a continuation-in-part of application No. 08/542,793, filed on Oct. 13, 1995, now abandoned, which is a continuation-in-part of application No. 08/070,510, filed on Jun. 1, 1993, now abandoned.

(60) Provisional application No. 60/042,439, filed on Mar. 28, 1997.

(51) Int. Cl.[7] ............................ A63B 37/06; A63B 37/12
(52) U.S. Cl. .................... 525/330.2; 473/373; 473/374
(58) Field of Search .................................. 473/373, 374; 525/330.2

(56) References Cited

U.S. PATENT DOCUMENTS

| 4,863,167 | * | 9/1989 | Matsuki . |
| 5,072,944 | * | 12/1991 | Nakahara . |
| 5,368,304 | * | 11/1994 | Sullivan . |
| 5,628,699 | | 5/1997 | Maruko et al. . |
| 5,674,137 | | 10/1997 | Maruko et al. . |
| 5,688,191 | * | 11/1997 | Cavallaro . |
| 5,702,311 | * | 12/1997 | Higuchi . |
| 5,725,442 | * | 3/1998 | Higuchi . |
| 5,733,205 | * | 3/1998 | Higuchi . |
| 5,780,169 | * | 7/1998 | Hiraoka . |
| 5,902,855 | | 5/1999 | Sullivan . |
| 6,057,403 | | 5/2000 | Sullivan et al. . |
| 6,083,119 | | 7/2000 | Sullivan et al. . |

FOREIGN PATENT DOCUMENTS

| 2 278 609 | 12/1994 | (GB) . |
| 2 299 999A | 10/1996 | (GB) . |
| WO 98/43709 | 10/1998 | (WO) . |

* cited by examiner

Primary Examiner—David J. Buttner

(57) ABSTRACT

The present invention is directed to a golf ball having a dual, or multilayer core component that is relatively soft and a hard cover that results in the golf ball exhibiting a reduced spin rate. The dual, or multilayer core component includes a center component and a core layer, each of which is independently formed from a thermoset material, a thermoplastic material, or a blend thereof. The dual core component is relatively soft, having a Riehle compression of at least 75. The cover is preferably formed from a high acid ionomer or a certain type of alpha-olefin such that the cover has a Shore D hardness of at least 65. The cover may be a single layer cover or a multilayer cover. The golf ball of the present invention may have an enlarged diameter which serves to further reduce spin rate. The resulting golf ball exhibits properties of reduced spin without sacrificing durability, playability and resilience.

17 Claims, 4 Drawing Sheets

LOW SPIN GOLF BALL HAVING A DUAL CORE CONFIGURATION

CROSS REFERENCES TO RELATED APPLICATIONS

This application is a continuation-in-part of Ser. No. 09/102,342, filed Jun. 22, 1998; which is a cintinuation-in-part of Ser. No. 08/716,016, filed Sep. 16, 1996, now U.S. Pat. No. 5,820,489; which is a divisional of U.S. application Ser. No. 08/255,442, filed Jun. 8, 1994, now abandoned; which is a continuation of U.S. application Ser. No. 08/054,406, filed Apr. 28, 1993, now U.S. Pat. No. 5,368,304. This application is also a continuation-in-part of U.S. application Ser. No. 09/049,410, filed Mar. 27, 1998, now U.S. Pat. No. 6,057,403; which claims priority from provisional application Ser. No. 60/042,439, filed Mar. 28, 1997; and is a continuation-in-part of U.S. application Ser. No. 08/926,872, filed Sep. 10, 1997; which is a divisional of U.S. application Ser. No. 08/631,613, filed Apr. 10, 1996, now U.S. Pat. No. 5,803,831; which is a continuation-in-part of both U.S. application Ser. No. 08/591,046, filed Jan. 25, 1996, now abandoned, and U.S. application Ser. No. 08/542,793, filed Oct. 13, 1995, now abandoned. U.S. application Ser. No. 08/542,793, now abandoned is a continuation-in-part of U.S. application Ser. No. 08/070,510, filed Jun. 1, 1993, now abandoned. This application is also a continuation-in-part of U.S. application Ser. No. 08/870,585, filed Jun. 6, 1997, which is a continuation of U.S. application Ser. No. 08/556,237, filed Nov. 9, 1995, now abandoned; which is a continuation-in-part of U.S. application Ser. No. 08/542,793, filed Oct. 13, 1995, now abandoned; which is a continuation-in-part of U.S. application Ser. No. 08/070,510, filed Jun. 1, 1993, now abandoned. This application is also a continuation-in-part of U.S. application Ser. No. 09/048,701, filed Mar. 28,1998; which claims priority from provisional application Ser. No. 60/042,439, filed Mar. 28, 1997.

FIELD OF THE INVENTION

The present invention relates to golf balls and, more particularly, to improved golf balls having low spin rates. The improvement in the golf balls results from a unique dual, or multilayer core which is relatively soft and a hard cover made from blends of one or more specific hard, high stiffness ionomers. The combination of a soft dual or multilayer core and a hard cover leads to an improved golf ball having a lower than anticipated spin rate while maintaining the resilience and durability characteristics necessary for repetitive play. In an additional embodiment of the invention, the spin rate is further reduced by decreasing the weight of the softened dual or multilayer core while maintaining core size and by increasing the thickness or weight of the cover. The larger, less dense finished dual core or multilayer ball exhibits lower spin rates after club impact than conventional balls.

BACKGROUND OF THE INVENTION

Spin rate is an important golf ball characteristic for both the skilled and unskilled golfer. High spin rates allow for the more skilled golfer, such as PGA professionals and low handicap players, to maximize control of the golf ball. This is particularly beneficial to the more skilled golfer when hitting an approach shot to a green. The ability to intentionally produce "back spin," thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer desires a high spin golf ball, a more efficient ball for the less skilled player is a golf ball that exhibits low spin properties. The low spin ball reduces slicing and hooking and enhances roll distance for the amateur golfer.

The present inventors have addressed the need for developing a golf ball having a reduced spin rate after club impact, while at the same time maintaining the durability, playability and resiliency characteristics needed for repetitive use. The reduced spin rate golf ball of the present invention meets the rules and regulations established by the United States Golf Association ("U.S.G.A.").

Along these lines, the U.S.G.A. has set forth five (5) specific regulations to which a golf ball must conform. The U.S.G.A. rules require that a ball be no smaller than 1.680 inches in diameter. However, notwithstanding this restriction, there is no specific limitation as to the maximum permissible diameter of a golf ball. As a result, a golf ball can be as large as desired so long as it is larger than 1.680 inches in diameter and so long as the other four (4) specific regulations are met.

The U.S.G.A. rules also require that balls weigh no more than 1.620 ounces, and that their initial velocity may not exceed 250 feet per second with a maximum tolerance of 2%, or up to 255 ft./sec. Further, the U.S.G.A. rules state that a ball may not travel a distance greater than 280 yards with a test tolerance of 6% when hit by the U.S.G.A. outdoor driving machine under specific conditions.

It has been determined by the present inventors that the combination of a relatively soft dual or multilayer core (i.e. an overall core Riehle compression of about 75 to 160) and a hard cover (i.e. Shore D hardness of 65 or more) significantly reduces the overall spin rate of the resulting golf ball. The inventors have also learned that an increase in cover thickness, thereby increasing the overall diameter of the resulting molded golf ball, further reduces spin rate.

Top-grade golf balls sold in the United States may be generally classified as one of two types: two-piece or three-piece balls. The two-piece ball, exemplified by the balls sold by Spalding & Evenflo Companies, Inc. (the assignee of the present invention through its wholly owned subsidiary, Lisco, Inc.) under the trademark TOP-FLITE, consists of a solid polymeric core and a separately formed outer cover. The so-called three-piece balls, exemplified by the balls sold under the trademark TITLEIST by the Acushnet Company, consist of a liquid (e.g., TITLEIST TOUR 384) or solid (e.g., TITLEIST DT) center, elastomeric thread windings about the center, and a cover.

Spalding's two-piece golf balls are produced by molding a natural (balata) or synthetic (i.e. thermoplastic resin such as an ionomer resin) polymeric cover composition around a preformed polybutadiene (rubber) core. During the molding process, the desired dimple pattern is molded into the cover material. In order to reduce the number of coating steps involved in the finishing of the golf balls, a color pigment or dye and, in many instances, an optical brightener, are added directly to the generally "off white" colored polymeric cover composition prior to molding. By incorporating the pigment and/or optical brightener in the cover composition molded onto the golf ball core, this process eliminates the need for a supplemental pigmented painting step in order to produce a white or colored (notably orange, pink and yellow) golf ball.

With respect to multi-layered golf balls, Spalding is the leading manufacturer of two-piece golf balls in the world. Spalding manufactures over sixty (60) different types of two-piece balls which vary distinctly in such properties as playability (i.e. spin rate, compression, feel, etc.), travel distance (initial velocity, C.O.R., etc.), durability (impact, cut and weather resistance) and appearance (i.e. whiteness, reflectance, yellowness, etc.) depending upon the ball's core, cover and coating materials, as well as the ball's surface configuration (i.e. dimple pattern). Consequently, Spalding's two-piece golf balls offer both the amateur and professional golfer a variety of performance characteristics to suit an individual's game.

In regard to the specific components of a golf ball, although the nature of the cover can, in certain instances, make a significant contribution to the overall feel, spin (control), coefficient of restitution ("C.O.R.") and initial velocity of a ball (see, for example, U.S. Pat. No. 3,819,768 to Molitor), the initial velocity of two-piece and three-piece balls is determined mainly by the coefficient of restitution of the core. The coefficient of restitution of the core of wound (i.e. three-piece) balls can be controlled within limits by regulating the winding tension and the thread and center composition. With respect to two-piece balls, the coefficient of restitution of the core is a function of the properties of the elastomer composition from which it is made.

The cover component of a golf ball is particularly influential in affecting the compression (feel), spin rates (control), distance (C.O.R.), and durability (i.e. impact and may be adjusted to optimize the desired properties of the resulting golf balls.

Over the last twenty (20) years, improvements in cover and core material formulations and changes in dimple patterns have more or less continually improved golf ball distance. Top-grade golf balls, however, must meet several other important design criteria. To successfully compete in today's golf ball market, a golf ball should be resistant to cutting and must be finished well; it should hold a line in putting and should have good click and feel. In addition, the ball should exhibit spin and control properties dictated by the skill and experience of the end user.

With respect to the increased size of the ball, over the years golf ball manufacturers have generally produced golf balls at or around the minimum size and maximum weight specifications set forth by the U.S.G.A. There have, however, been exceptions, particularly in connection with the manufacture of golf balls for teaching aids. For example, oversized, overweight (and thus unauthorized) golf balls have been on sale for use as golf teaching aids (see U.S. Pat. No. 3,201,384 to Barber).

Oversized golf balls are also disclosed in New Zealand Patent No. 192,618 dated Jan. 1, 1980, issued to a predecessor of the present assignee. This patent teaches an oversize golf ball having a diameter between 1.700 and 1.730 inches and an oversized core of resilient material (i.e. about 1.585 to 1.595 inches in diameter) so as to increase the coefficient of restitution. Additionally, the patent discloses that the ball should include a cover having a thickness less than the cover thickness of conventional balls (i.e. a cover thickness of about 0.050 inches as opposed to 0.090 inches for conventional two-piece balls).

In addition, it is also noted that golf balls made by Spalding in 1915 were of a diameter ranging from 1.630 inches to 1.710 inches. As the diameter of the ball increased, the weight of the ball also increased. These balls were comprised of covers made up of balata/gutta percha and cores made from solid rubber or liquid sacs and wound with elastic thread.

Golf balls known as the LYNX JUMBO were also commercially available by Lynx in October, 1979. These balls had a diameter of 1.76 to 1.80 inches. The LYNX JUMBO balls met with little or no commercial success. The balls consisted of a core comprised of wound core and a cover comprised of natural or synthetic balata.

However, notwithstanding the enhanced diameters of these prior golf balls, none of these balls produced the enhanced spin reduction characteristics and overall playability, distance and durability properties of the present invention and/or fell within the regulations set forth by the U.S.G.A. An object of the present invention is to produce a U.S.G.A. regulation golf ball having improved low spin properties while maintaining the resilience and durability characteristics necessary for repetitive play.

As noted, a number of two-piece (a solid resilient center or core with a molded cover) and three-piece (a liquid or solid center, elastomeric winding about the center, and a molded cover) golf balls have been produced. The different types of materials utilized to formulate the cores, covers, etc. of these balls dramatically alters the balls' overall characteristics. In addition, multi-layered covers containing one or more ionomer resins and other combinations of thermoplastic materials have also been formulated in an attempt to produce a golf ball having the overall distance, playability and durability characteristics desired.

Despite the great number of materials and combinations of materials utilized in prior art golf balls, there still remains a need for an improved golf ball exhibiting superior properties.

These and other objects and features of the invention will be apparent from the following summary and description of the invention and from the claims.

SUMMARY OF THE INVENTION

The present invention is directed to improved golf balls having a low rate of spin upon club impact. The golf balls comprise a dual, or multilayer core component that is preferably soft, and further comprise a relatively hard cover. The hard cover may preferably be sized to produce a ball that is larger than conventional diameters. The low spin rate enables the ball to travel a greater distance. In addition, the low spin rate provides the less skilled golfer with more control. This is because the low spin rate decreases undesirable side spin which leads to slicing and hooking. The combination of a hard cover and a soft core provides for a ball having a lower than anticipated spin rate while maintaining high resilience and good durability.

Through the use of the softer cores and the hard cover, overall finished balls of the invention exhibit significantly lower spin rates than conventional balls of equal size and weight. Further, reduction in spin is also produced by increasing the thickness of the cover and by decreasing the weight of the softened core.

In a first aspect of the present invention, a low spin golf ball is provided, comprising a dual or multilayer core having a center component and a core layer disposed about the center component. The dual core is relatively soft, having an overall core Riehle compression of at least about 75. The golf ball further comprises a relatively hard cover disposed about the dual core. The cover has a Shore D hardness of at least about 65.

In another aspect, the present invention provides a low spin golf ball comprising a dual core having a center component and a core layer disposed about the center component. The golf ball further comprises a multi-layer cover disposed about the dual core. The cover is relatively hard, having a Shore D hardness of at least about 65.

In another aspect, the present invention provides a low spin golf ball comprising a dual core having a center component that includes a thermoplastic material and a core layer that includes a thermoset material. The core has a Riehle compression of at least about 75. The golf ball further comprises a cover disposed around the dual core, the cover having a Shore D hardness of at least about 65.

In yet another aspect, the present invention provides a golf ball comprising a dual core having a center component that includes a thermoset material and a core layer comprising a thermoplastic material. The core has a Riehle compression of at least about 75. The golf ball further comprises a cover disposed about the dual core configuration. The cover is relatively hard, having a Shore D hardness of at least about 65.

In a further aspect, the present invention provides a low spin golf ball comprising a dual core having a center component and a core layer disposed about the center component. The center component and the core layer both comprise a thermoplastic material. The core has a Riehle compression of at least about 75. The low spin golf ball further comprises a cover surrounding the dual core. The cover has a Shore D hardness of at least about 65.

In yet another aspect, the present invention provides a low spin golf ball comprising a dual core having a center component and a core layer disposed about the center component. The golf ball further comprises a cover disposed on the dual core, the cover comprising a particular high acid ionomer resin, and/or a certain alpha olefin.

In all aspects, the covers may be in the form of a multilayer cover described in greater detail herein.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE PREFERRED EMBODIMENTS

The present invention relates to the development of a golf ball having a low spin rate as a result of combining a relatively soft dual or multilayer core configuration and a hard cover. Such a lower spin rate after club impact contributes to straighter shots when the ball is mis-hit, greater efficiency in flight, and a lesser degree of energy loss on impact with the ground, adding increased roll or distance.

In addition, by increasing the diameter of the overall ball of the present invention beyond the U.S.G.A. minimum of 1.680 inches, the spin rate is still further decreased. In this embodiment of the invention, the ball, even though of larger diameter, uses substantially the same size overall core configuration as a standard golf ball, the difference in size being provided by the additional thickness in the cover of the ball. This larger, low spin ball produces even greater control and flight efficiency than the standard size ball embodiment of the present invention.

Figure 1:
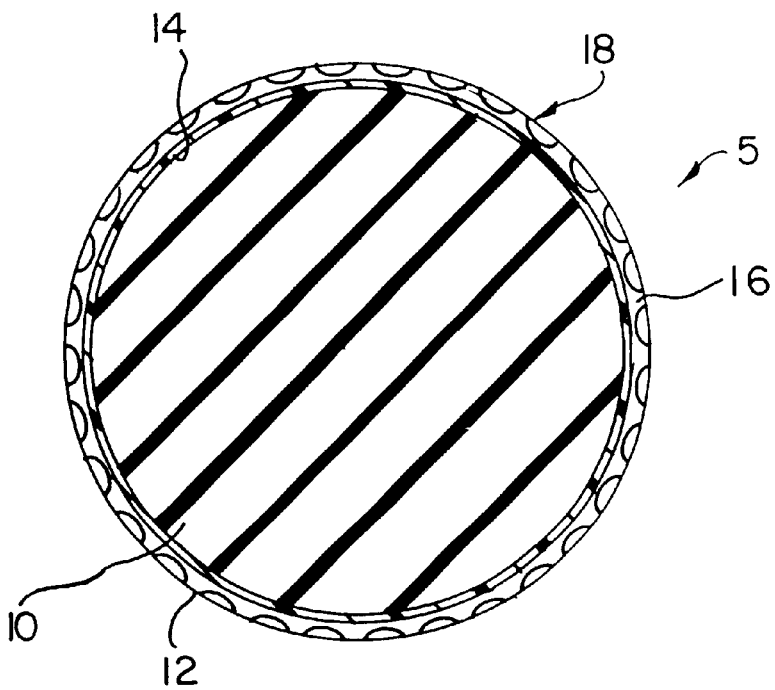
FIG. 1 is a cross-sectional view of a preferred embodiment golf ball in accordance with the present invention illustrating a core and a cover comprising an inner layer and an outer dimpled layer.
Figure 2:
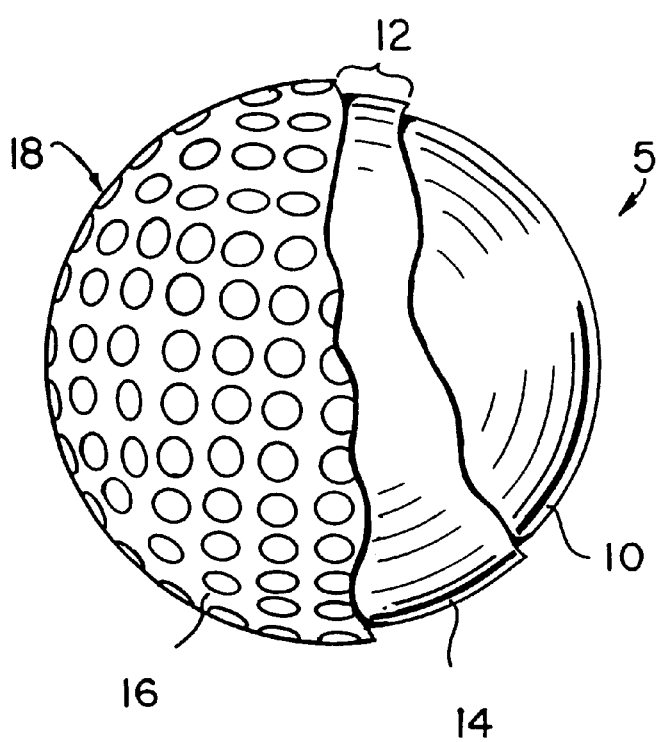
FIG. 2 is a diametrical cross-sectional view of the preferred embodiment golf ball depicted in FIG. 1 having a core and a cover comprising an inner layer surrounding the core and an outer layer having a plurality of dimples.

FIGS. 1 and 2 illustrate a preferred embodiment golf ball 5 in accordance with the present invention. It will be understood that none of the referenced figures are to scale. And so, the thicknesses and proportions of the various layers and the diameter of the various core components are not necessarily as depicted. The golf ball 5 comprises a multi-layer cover 12 disposed about a core 10. The core 10 of the golf ball can be formed of a solid, a liquid, or any other substances that may be utilized to form the novel dual core described herein. The multi-layered cover 12 comprises two layers: a first or inner layer or ply 14 and a second or outer layer or ply 16.

The inner layer 14 can be ionomer, ionomer blends, non-ionomer, non-ionomer blends, or blends of ionomer and non-ionomer. The outer layer 16 can be ionomer, ionomer blends, non-ionomer, non-ionomer blends or blends of ionomer and non-ionomer. A plurality of dimples 18 are defined along the outer surface of the ball 5. References to several measurements referred to herein are as follows:

Riehle compression is a measurement of the deformation of a golf ball in thousandths of inches under a fixed static load of 200 pounds (a Riehle compression of 47 corresponds to a deflection under load of 0.047 inches).

PGA compression is determined by a force applied to a spring (i.e. 80 PGA=80 Riehle; 90 PGA=70 Riehle; and 100 PGA=60 Riehle) manufactured by Atti Engineering, Union City, N.J.

Coefficient of restitution (C.O.R.) is measured by firing the resulting golf ball in an air cannon at a velocity of 125 feet per second against a steel plate which is positioned 12 feet from the muzzle of the cannon. The rebound velocity is then measured. The rebound velocity is divided by the forward velocity to give the coefficient of restitution.

Shore hardness was measured in accordance with ASTM Test

The Cores

The present invention golf balls, in a preferred embodiment, utilize a unique dual core configuration. Preferably, the cores comprise (i) an interior spherical center component formed from a thermoset material, a thermoplastic material, or combinations thereof and (ii) a core layer disposed about the spherical center component, the core layer formed from a thermoset material, a thermoplastic material, or combinations thereof. Most preferably, the core layer is disposed immediately adjacent to, and in intimate contact with the center component. The cores may further comprise (iii) an optional outer core layer disposed about the core layer. Most preferably, the outer core layer is disposed immediately adjacent to, and in intimate contact with the core layer. The outer core layer may be formed from a thermoset material, a thermoplastic material, or combinations thereof.

As previously noted, the resulting core, having this dual, or multilayer core configuration, is relatively soft. The dual, or multilayer core component has a Riehle compression of about 75 or more, and preferably a Riehle compression of about 75 to about 160. The dual, or multilayer core component has a relatively low PGA compression of about 0 to about 85, and preferably about 10 to about 70. The resilience or coefficient of restitution of the dual, or multilayer core is about 0.750 or more, preferably about 0.760 or more, and most preferably about 0.770 to about 0.780. The cores have a weight of about 25 to about 40 grams, and preferably about 30 to about 40 grams.

The present invention provides several additionally preferred embodiment golf balls utilizing the unique dual, or multilayer core configuration. In one aspect, a preferred embodiment golf ball comprises a core center formed from a thermoset material surrounded by a core layer formed from a thermoplastic material. A cover surrounds the core center and the core layer.

In another embodiment, a golf ball comprises a core center formed from a thermoplastic material surrounded by a core layer. The core layer is formed from a thermoset material. A cover surrounds the core and the core layer.

In yet another embodiment, a golf ball comprises a core center formed from a thermoplastic material. A core layer surrounds the core. The core layer is formed from a thermoplastic material which may be the same as the material utilized for the core center, or one or more other or different thermoplastic materials. This embodiment golf ball utilizes an optional outer core layer that surrounds the core center and the core layer. The outer core layer is formed from a thermoplastic material which may be the same or different than any of the thermoplastic materials utilized for the core center and the core layer. The golf ball further comprises a cover.

In yet another embodiment, a golf ball comprises a core center formed from a thermoplastic, thermoset material, or any combination of a thermoset and thermoplastic material. A core layer surrounds the core center. The core layer is formed from a thermoset material. This embodiment golf ball also comprises an optional outer core layer formed from a thermoplastic material. A cover is disposed about, and generally surrounds, the core center, the core layer and the outer core.

Figure 3:
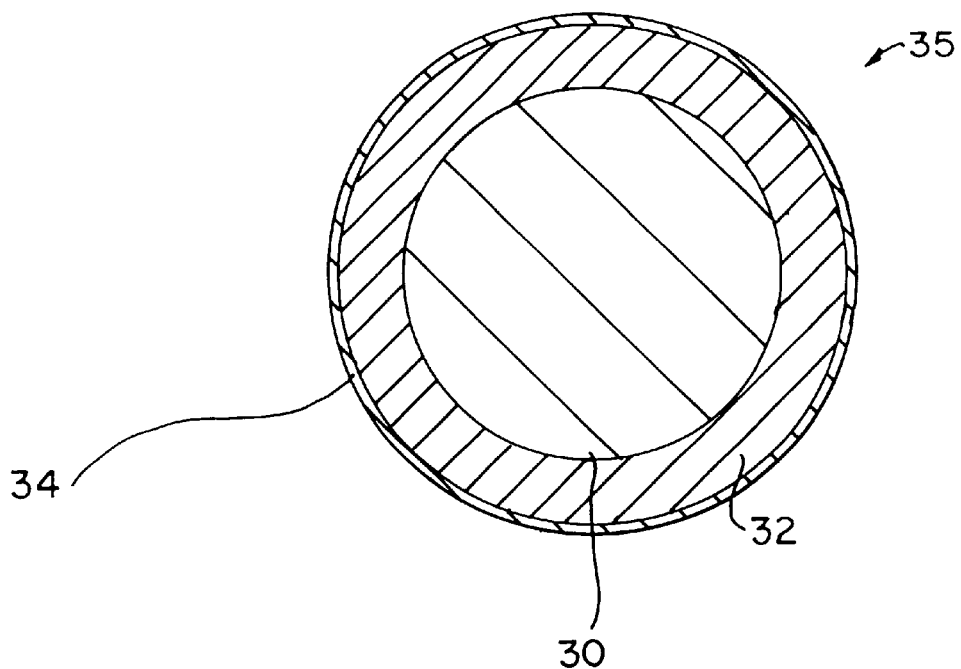
FIG. 3 is a cross-sectional view of another preferred embodiment golf ball in accordance with the present invention comprising a dual core component.

The present invention provides several additionally preferred embodiment golf balls utilizing the unique dual core configuration and one or more cover layers. Referring to FIG. 3, a preferred embodiment golf ball 35 is illustrated comprising a core 30 formed from a thermoset material surrounded by a core layer 32 formed from a thermoplastic material. A cover 34 surrounds the core 30 and core layer 32. The cover 34 may be a single layer cover or a multi-layer cover as described herein. If the cover 34 is a multilayer cover, it preferably corresponds to the previously described multi-layer cover 1.

Figure 4:
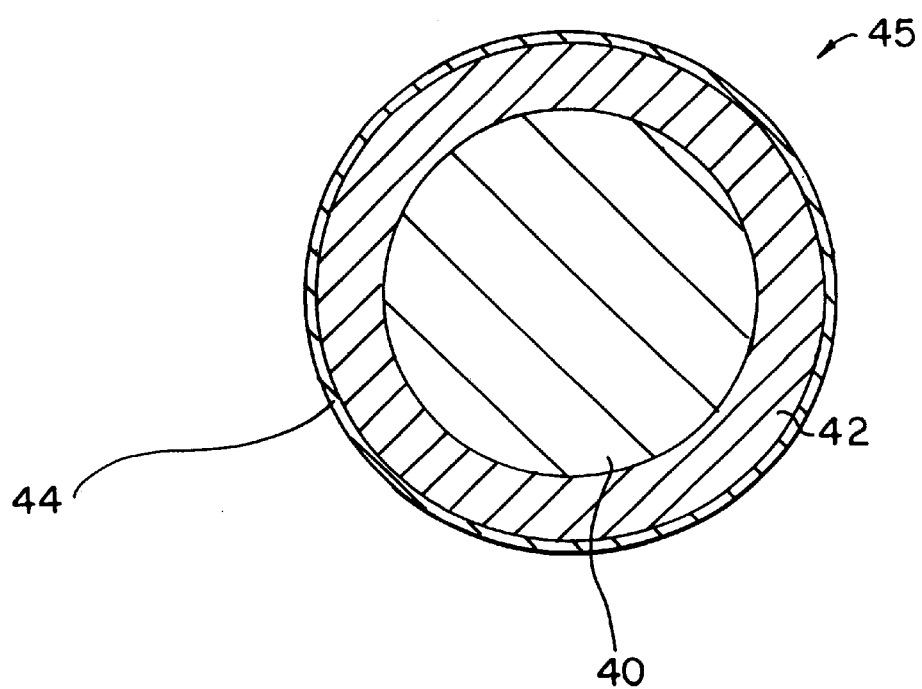
FIG. 4 is a cross-sectional view of yet another preferred embodiment golf ball in accordance with the present invention comprising a dual core component.

As illustrated in FIG. 4, another preferred embodiment golf ball 45 in accordance with the present invention is illustrated. The preferred embodiment golf ball 45 comprises a core 40 formed from a thermoplastic material surrounded by a core layer 42. The core layer 42 is formed from a thermoset material. A cover 44 surrounds the core 40 and the core layer 42.

Again, the cover 44 may be a single or a multi-layer cover. If the cover 44 is a multi-layer cover, it preferably corresponds to the previously described multi-layer cover 12.

Figure 5:
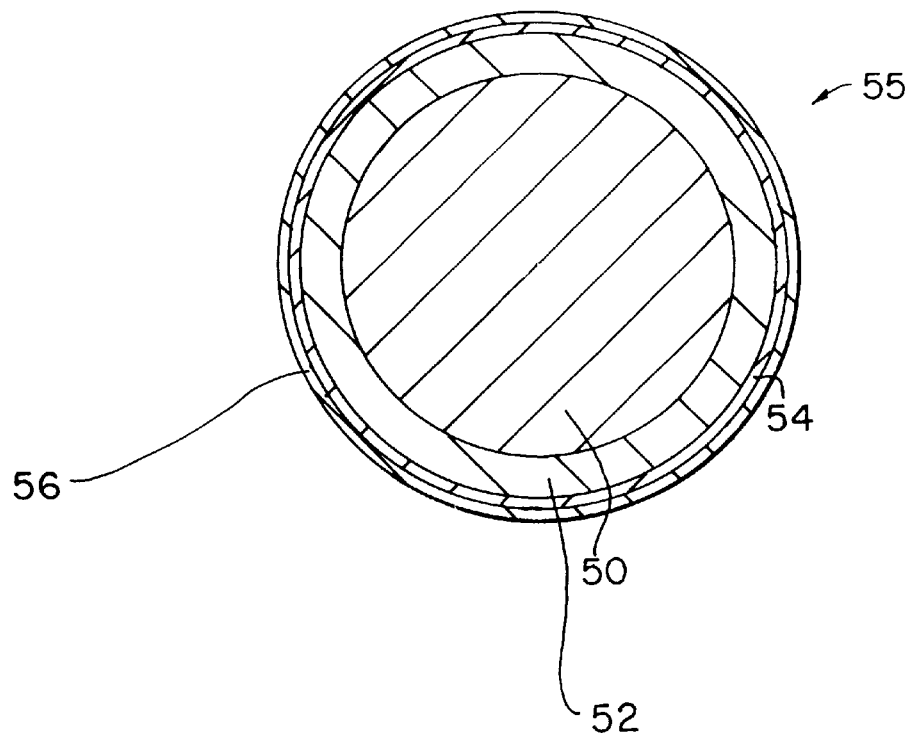
FIG. 5 is a cross-sectional view of another preferred embodiment golf ball in accordance with the present invention comprising a dual core component and an outer core layer.

FIG. 5 illustrates yet another preferred embodiment golf ball 55 in accordance with the present invention. The preferred embodiment golf ball 55 comprises a core 50 formed from a thermoplastic material. A core layer 52 surrounds the core 50. The core layer 52 is formed from a thermoplastic material which may be the same as the material utilized with the core 50, or one or more other or different thermoplastic materials. The preferred embodiment golf ball 55 utilizes an optional outer core layer 54 that surrounds the core component 50 and the core layer 52. The outer core layer 54 is formed from a thermoplastic material which may be the same or different than any of the thermoplastic materials utilized by the core 50 and the core layer 52. The golf ball 55 further comprises a cover 56, either single or multilayer, which if a multilayer, preferably is similar to the previously described multi-layer cover 12.

Figure 6:
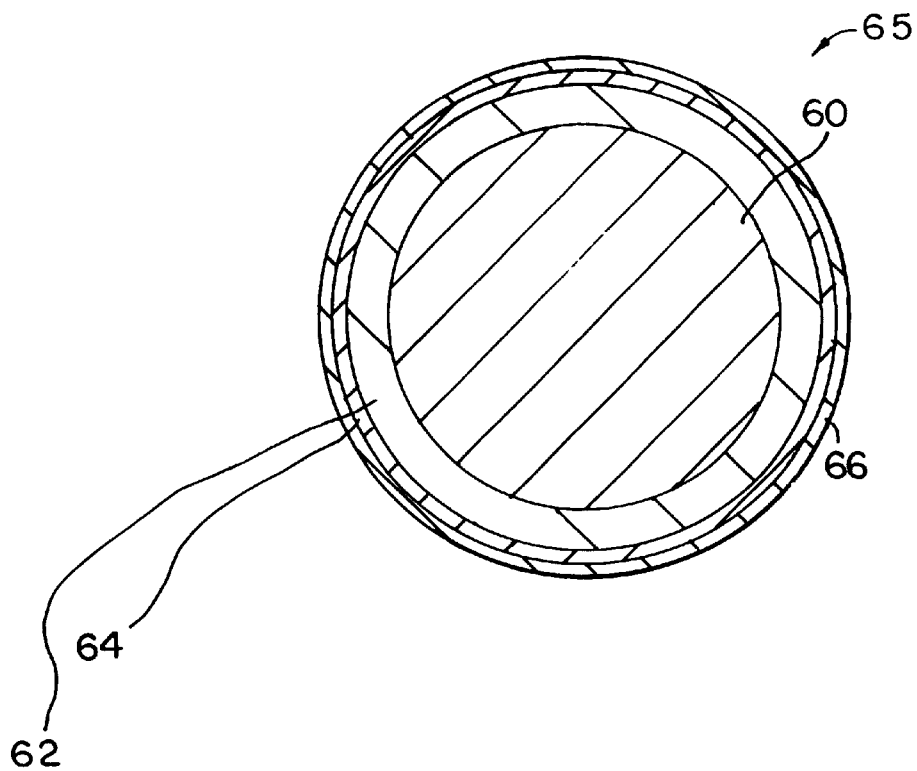
FIG. 6 is a cross-sectional view of yet another preferred embodiment golf ball in accordance with the present invention comprising a dual core component and an outer core layer.

FIG. 6 illustrates yet another preferred embodiment golf ball 65 in accordance with the present invention. The preferred embodiment golf ball 65 comprises a core 60 formed from a thermoplastic, thermoset material, or any combination of a thermoset and thermoplastic material. A core layer 62 surrounds the core 60. The core layer 62 is formed from a thermoset material. The preferred embodiment golf ball 65 also comprises an optional outer core layer 64 formed from a thermoplastic material. A single or multi-layer cover 66, preferably similar to the previously described multi-layer cover 1, is disposed about, and generally surrounds, the core 60, the core layer 62 and the outer core 64.

A wide array of thermoset materials can be utilized in the dual or multilayer cover of the present invention. Examples of suitable thermoset materials include butadiene or any natural or synthetic elastomer, including metallocene polyolefins, polyurethanes, silicones, polyamides, polyureas, or virtually any irreversibly cross-linked resin system. Similarly a polybutadiene elastomer could be further used. It is also contemplated that epoxy, phenolic, and an array of unsaturated polyester resins could be utilized.

The thermoplastic material used in the present invention golf balls and, particularly their dual or multilayer cores include a wide assortment of thermoplastic materials. Examples of typical thermoplastic materials for incorporation in the golf balls of the present invention include, but are not limited to, ionomers, polyurethane thermoplastic elastomers, and combinations thereof. It is also contem plated that a wide array of other thermoplastic materials could be utilized, such as polysulfones, fluoropolymers, polyamide-imides, polyarylates, polyaryletherketones, polyaryl sulfones/polyether sulfones, polybenzimidazoles, polyether-imides, polyimides, liquid crystal polymers, polyphenylene sulfides; and specialty high-performance resins, which would include fluoropolymers, polybenzimidazole, and ultrahigh molecular weight polyethylenes.

Additional examples of suitable thermoplastics include metallocenes, polyvinyl chlorides, acrylonitrile-butadiene-styrenes, acrylics, styrene-acrylonitriles, styrene-maleic anhydrides, polyamides (nylons), polycarbonates, polybutylene terephthalates, polyethylene terephthalates, polyphenylene ethers/polyphenylene oxides, reinforced polypropylenes, and high-impact polystyrenes.

Preferably, the thermoplastic materials have relatively high melting points, such as a melting point of at least about 300° F. Several examples of these preferred thermoplastic materials and which are commercially available include, but are not limited to, Capron (trademarked by Allied Signal Plastics for a blend of nylon and ionomer), Lexan (trademarked by General Electric for polycarbonate), Pebax (trademarked by Elf Atochem for a polyether block amide), and Hytrel (trademarked by Dupont for a series of polyester elastomers). The polymers or resin system may be cross-linked by a variety of means such as by peroxide agents, sulphur agents, radiation or other cross-linking techniques.

Any or all of the previously described components in the cores of the preferred embodiment golf balls of the present invention may be formed in such a manner, or have suitable fillers added, so that their resulting density is decreased or increased. For example, any of the components in the dual or multilayer cores could be formed or otherwise produced to be light in weight. For instance, the components could be foamed, either separately or in-situ. Related to this, a foamed light weight filler agent may be added. In contrast, any of these components could be mixed with, or otherwise receive, various high density filler agents or other weighting components such as relatively high density fibers or particulate agents in order to increase their mass or weight.

The following commercially available thermoplastic resins are particularly preferred for use in the noted dual cores employed in the preferred embodiment golf balls of the present invention: Capron 8351 (available from Allied Signal Plastics), Lexan ML5776 (from General Electric), Pebax 3533 (a polyether block amide from Elf Atochem), and Hytrel G4074 (from DuPont). Properties of these four preferred thermoplastics are set forth below in Tables 1–4. When forming a golf ball in accordance with the present invention, if the interior center component of the dual core is to comprise a thermoplastic material, it is most preferred to utilize Pebax thermoplastic resin.

TABLE 1

CAPRON 8351

|  | DAM | 50% RH | ASTM Test |
|---|---|---|---|
| MECHANICAL | | | |
| Tensile Strength, Yield, psi (MPa) | 7,800 (54) | — | D-638 |
| Flexural Strength, psi (MPa) | 9,500 (65) | — | D-790 |
| Flexural Modulus, psi (MPa) | 230,000 (1,585) | — | D-790 |
| Ultimate Elongation, % | 200 | — | D-638 |

TABLE 1-continued

CAPRON 8351

|  | DAM | 50% RH | ASTM Test |
|---|---|---|---|
| Notched Izod Impact, ft-lbs/in (J/M) | No Break | — | D-256 |
| Drop Weight Impact, ft-lbs (J) | 150 (200) | — | D-3029 |
| Drop Weight Impact, @ −40° F., ft-lbs (J) | 150 (200) | — | D-3029 |
| PHYSICAL | | | |
| Specific Gravity | 1.07 | — | D-792 |
| THERMAL | | | |
| Melting Point, ° F. (° C.) | 420 (215) | — | D-789 |
| Heat Deflection @ 264 psi ° F. (° C.) | 140 (60) | — | D-648 |

TABLE 2

Lexan ML5776

| PROPERTY | TYPICAL DATA | UNIT | METHOD |
|---|---|---|---|
| MECHANICAL | | | |
| Tensile Strength, yield, Type I, 0.125" | 8500 | psi | ASTM D 638 |
| Tensile Strength, break, Type I, 0.125" | 9500 | psi | ASTM D 638 |
| Tensile Elongation, yield, Type I, 0.125" | 110.0 | % | ASTM D 638 |
| Flexural Strength, yield, 0.125" | 12000 | psi | ASTM D 790 |
| Flexural Modulus, 0.125" | 310000 | psi | ASTM D 790 |
| IMPACT | | | |
| Izod Impact, unnotched, 73F | 60.0 | ft-lb/in | ASTM D 4812 |
| Izod Impact, notched, 73F | 15.5 | ft-lb/in | ASTM D 256 |
| Izod Impact, notches, 73F, 0.250" | 12.0 | ft-lb/in | ASTM D 256 |
| Instrumented Impact Energy @ Peak, 73F | 48.0 | ft-lbs | ASTM D 3763 |
| THERMAL | | | |
| HDT, 264 psi, 0.250", unannealed | 257 | deg F. | ASTM D 648 |
| Thermal Index, Elec Prop | 80 | deg C. | UL 7468 |
| Thermal Index, Mech Prop with impact | 80 | deg C. | UL 7468 |
| Thermal Index, Mech Prop without impact | 80 | deg C. | UL 7468 |
| PHYSICAL | | | |
| Specific Gravity, solid | 1.19 | — | ASTM D 792 |
| Water Absorption, 24 hours @ 73F | 0.150 | % | ASTM D 570 |
| Mold Shrinkage, flow, 0.125" | 5.7 | in/in E-3 | ASTM D 955 |
| Melt Flow Rate, nom'l, 300C/1.2 kgf (0) | 7.5 | g/10 min | ASTM D 1238 |
| FLAME CHARACTERISTICS | | | |
| UL File Number, USA | E121562 | — | — |
| 94HB Rated (tested thickness) | 0.060 | inch | UL 94 |

TABLE 3

PEBAX ® 3533 RESIN

| PROPERTY | ASTM TEST METHOD | UNITS | 3533 |
| --- | --- | --- | --- |
| Specific Gravity | D792 | | 1.01 |
| Water Absorption Equilibrium (20° C., 50% R.H.>) | | | 0.5 |
| 24 Hr. Immersion | D570 | | 1.2 |
| Hardness | D2240 | | 35D |
| Tensile Strength, Ultimate | D638 | psi | 5600 |
| Elongation, Ultimate | D638 | % | 580 |
| Flexural Modulus | D790 | psi | 2800 |
| Izod Impact, Notched | D256 | ft-lb./in. | |
| 20° C. | | | NB |
| −40° C. | | | NB |
| Abrasion Resistance H18/1000 g | D1044 | Mg/1000 Cycles | 104 |
| Tear Resistance Notched | D624C | lb./in. | 260 |
| Melting Point | D3418 | ° F. | 306 |
| Vicat Softening Point | D1525 | ° F. | 165 |
| HDT 66 psi | D648 | ° F. | 115 |
| Compression Set (24 hr., 160° F.) | D395A | % | 54 |

TABLE 4

HYTREL G4074
Thermoplastic Elastomer

| PHYSICAL | | | | |
| --- | --- | --- | --- | --- |
| Dens/Sp Gr | ASTM D792 | | 1.1800 | sp gr 23/23C |
| Melt Flow | ASTM D1238 | 5.20 @ E - 190 C/2.16 kg | | g/10/min |
| Wat Abs | ASTM D570 | | 2.100% | |
| MECHANICAL | | | | |
| Elong @ Brk | ASTM D638 | | 230.0% | |
| Flex Mod | ASTM D790 | | 9500 psi | |
| TnStr @ Brk | ASTM D638 | | 2000 psi | |
| IMPACT | | | | |
| Notch Izod | ASTM D256 | No Break @ 73.0 F @ 0.2500 inft-lb/in 0.50 @ −40.0 F @ 0.2500 inft-lb/in | | |
| HARDNESS | | | | |
| Shore | ASTM D2240 | | 40 Shore D | |
| THERMAL | | | | |
| DTUL @ 66 Melt Point | ASTM D648 | | 122 F 338.0 F | |
| Vicat Soft Melt Point | ASTM D1525 | | 248 F | |

The cores have a weight of about 25 to 40 grams and preferably about 30 to 40 grams. The cores and/or core centers can be molded from the previously noted materials. For example the core can be molded from a slug of uncured or lightly cured elastomer composition comprising a high cis content polybutadiene and a metal salt of an α, β, ethylenically unsaturated carboxylic acid such as zinc mono- or diacrylate or methacrylate. To achieve higher coefficients of restitution and/or to increase hardness in the core, the manufacturer may increase the amount of zinc diacrylate co-agent. In addition, larger amounts of metal oxide such as zinc oxide may be included in order to increase the core weight so that the finished ball more closely approaches the U.S.G.A. upper weight limit of 1.620 ounces. Non-limiting examples of other materials which may be used in the core composition include compatible rubbers or ionomers, and low molecular weight fatty acids such as stearic acid. Free radical initiator catalysts such as peroxides are admixed with the core composition so that on the application of heat and pressure, a curing or cross-linking reaction takes place.

The dual or multilayer cores of the present invention are preferably formed by compression molding techniques. However, it is fully contemplated that liquid injection molding or transfer molding techniques could be utilized.

Figure 7:
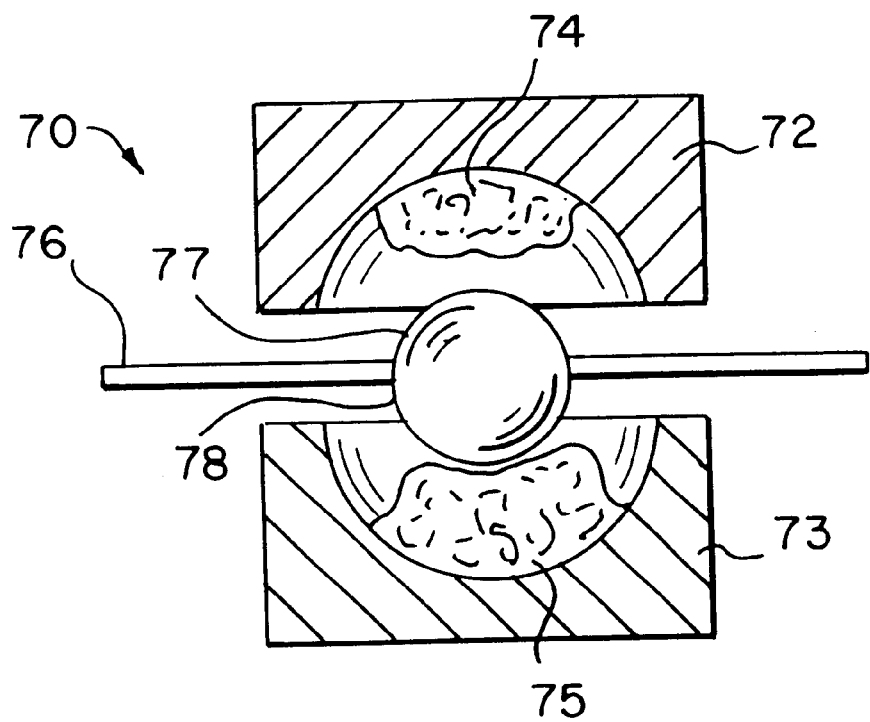
FIG. 7 is a schematic view of an assembly used for molding a preferred embodiment golf ball in accordance with the present invention.

For purposes of example and as illustrated in FIG. 7, a thermoset material, i.e. a core layer, is formed about an inner core component comprising a thermoplastic material. In this regard, one or more preforms 75 of a thermoset material, i.e. utilized to form the core layer, are preheated in an oven for one-half hour at 170° F. and placed in the bottom 73 of a molding assembly 70. A Teflon-coated plate 76 with two hemispheres 77 and 78 and, each about 0.840 inches in diameter, is placed on top of the preforms. Additional preforms, preheated as described above, are placed in the corresponding cavities of a top mold 72. The bottom mold 73 is engaged with the top mold 72 and the assembly flipped or otherwise inverted. The bottom one half of the mold assembly 70 then becomes the top one half of the mold assembly. The mold assembly 70 is then placed in a press and cold formed at room temperature using approximately 10 tons of pressure in a steam press. The molding assembly 70 is closed for approximately two minutes and pressure released. The molding assembly 70 is then opened and the Teflon plate 76 is removed thereby leaving one or more essentially perfectly formed one-half shells or cavities in the thermoset material. Previously formed thermoplastic core centers are then placed in the bottom cavities and the top portion 72 of the molding assembly 70 is placed on the bottom 73 and the materials disposed therebetween cured. The golf ball produced by this method had an inner core diameter of 0.840 inches in diameter. The outer core diameter had a final diameter of 1.470 inches, and a pre-mold diameter of 1.490 inches.

Four golf balls in accordance with the present invention were formed, each using a preferred and commercially available high melting point thermoplastic material as an inner core or center component. Table 5, set forth below, summarizes these balls.

TABLE 5

|  |  | Capron 8351 | Lexan ML 5776-7539 | Pebax 3533 | Hytrel G-4074 | Control (Single Core) |
|---|---|---|---|---|---|---|
| Inner Core | Size (inches) | 0.835 | 0.854 | 0.840 | 0.831 | — |
|  | Weight (grams) | 5.33 | 6.14 | 5.08 | 5.81 | — |
|  | Rebound % (100") | 78 | 83 | 65 | 61 | — |
|  | Shore C (surface) | — | — | 57 | 73 | — |
|  | Shore D (surface) | 75 | 83 | 36 | 47 | — |
| Outer Core | Cis 1,4 Polybutadiene | 100 | 100 | 100 | 100 | 100 |
| Formulation | Zinc oxide | 27 | 26 | 28 | 21 | 25 |
|  | Zinc stearate | 16 | 16 | 16 | 16 | 15 |
|  | Zinc diacrylate | 20 | 20 | 24 | 24 | 18 |
|  | 231 XL | 0.9 | 0.9 | 0.9 | 0.9 | 0.9 |
|  |  | 163.9 | 162.9 | 168.9 | 161.9 | 158.9 |
| Dual Core | Size (inches) | 1.561 | 1.560 | 1.562 | 1.563 | 1.562 |
| Properties | Weight (grams) | 37.7 | 37.8 | 37.8 | 37.5 | 37.8 |
|  | Compression (riehle) | 79 | 80 | 99 | 93 | 114 |
|  | COR | .689 | .603 | .756 | .729 | .761 |
| Molded Ball | Size (inches | 1.685 | 1.683 | 1.682 | 1.683 | 1.685 |
| Properties | Weight (grams) | 45.3 | 45.5 | 45.5 | 45.2 | 45.4 |
|  | Compression (riehle) | 78 | 80 | 89 | 87 | 102 |
|  | COR | .750 | .667 | .785 | .761 | .788 |

| Cover Stock (used on all above balls) |  |  |  |  |
|---|---|---|---|---|
| Surlyn 8940 | 22 | *T.G. MB Iotek 7030 |  | 75.35 |
| Surlyn 9910 | 54.5 | Unitane 0-110 |  | 23.9 |
| Surlyn 8320 | 10 | Ultra Marine Blue |  | 0.46 |
| Surlyn 8120 | 4 | Eastonbrite OB-1 |  | 0.26 |
| T.G. MB* | 9.5 | Santonox R |  | 0.038 |
|  | 100.0 |  |  | 100.00 |

Most preferably, the preferred embodiment dual cores of the resent invention have the following dimensions:

| Size Specifications: | Preferred | Most Preferred |
|---|---|---|
| Core (Center) - Max. | 1.250" | 1.00" |
| - Min. | 0.500" | 0.70" |
| Core Layer - Max. | 1.600" | 1.570" |
| - Min. | 1.500" | 1.550" |

It is also contemplated that in another embodiment, or class of embodiments, that the present invention golf ball utilize a wound core. Wound cores are generally produced by winding a very long elastic thread around a solid or liquid filled balloon center. The elastic thread is wound around the center to produce a finished core of about 1.4 to 1.6 inches in diameter, generally.

The Covers

The covers of the preferred embodiment low-spin golf balls of the present invention are preferably comprised of a hard, high-stiffness ionomer resin, most preferably a metal cation neutralized high acid ionomer resin containing more than 16% carboxylic acid by weight, or blend thereof. The covers have a Shore D hardness of about 65 or greater. Any of the following covers may be utilized in conjunction with any of the previously described cores.

With respect to the preferred ionomeric cover composition of the invention, ionomeric resins are polymers containing interchain ionic bonding. As a result of their toughness, durability, and flight characteristics, various ionomeric resins sold by E.I. DuPont de Nemours & Company under the trademark "Surlyn®" and more recently, by the Exxon Corporation (see U.S. Pat. No. 4,911,451, incorporated herein by reference) under the trademark "Escor®" and the tradename "Iotek", have become the materials of choice for the construction of golf ball covers over the traditional "balata" (transpolyisoprene, natural or synthetic) rubbers.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e., improved durability, etc. for golf ball construction over balata.

The ionomeric resins utilized to produce cover compositions can be formulated according to known procedures such as those set forth in U.S. Pat. No. 3,421,766 or British Patent No. 963,380, with neutralization effected according to procedures disclosed in Canadian Patent Nos. 674,595 and 713,631, all of which are hereby incorporated by reference, wherein the ionomer is produced by copolymerizing the olefin and carboxylic acid to produce a copolymer having the acid units randomly distributed along the polymer chain. Broadly, the ionic copolymer generally comprises one or more α-olefins and from about 9 to about 20 weight percent of α, β-ethylenically unsaturated mono- or dicarboxylic acid, the basic copolymer neutralized with metal ions to the extent desired.

At least about 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-1, hexene-1 and the like. Unsaturated carboxylic acids include acrylic, methacrylic, ethacrylic, α-chloroacrylic, crotonic, maleic, fumaric, itaconic acids, and the like. The ionomeric resins utilized in the golf ball industry are generally copolymers of ethylene with acrylic (i.e., Escor®) and/or methacrylic (i.e., Surlyn®) acid. In addition, two or more types of ionomeric resins may be blended in to the cover compositions in order to produce the desired properties of the resulting golf balls.

The cover compositions which may be used in making the preferred embodiment low-spin golf balls of the present invention are set forth in detail but not limited to those in U.S. Pat. No. 5,688,869, incorporated herein by reference. In short, the cover material is comprised of hard, high stiffness ionomer resins, preferably containing relatively high amounts of acid (i.e., greater than 16 weight percent acid, preferably from about 17 to about 25 weight percent acid, and more preferably from about 18.5 to about 21.5 weight percent) and at least partially neutralized with metal ions (such as sodium, zinc, potassium, calcium, magnesium and the like). The high acid resins are blended and melt processed to produce compositions exhibiting enhanced hardness and coefficient of restitution values when compared to low acid ionomers, or blends of low acid ionomer resins containing 16 weight percent acid or less.

The preferred cover compositions may also be prepared from specific blends of two or more high acid ionomers with other cover additives which do not exhibit the processing, playability, distance and/or durability limitations demonstrated by the prior art. However, as more particularly indicated below, the cover composition can also be comprised of one or more low acid ionomers so long as the molded covers exhibit a hardness of 65 or more on the Shore D scale. These include lithium ionomers or blends of ionomers with harder non-ionic polymers such as nylon, polyphenylene oxide and other compatible thermoplastics. Examples of cover compositions which may be used are set forth in detail in copending U.S. Ser. No. 07/776,803 filed Oct. 15, 1991, now abandoned and Ser. No. 07/901,660 filed Jun. 19, 1992, now having matured into U.S. Pat. No. 5,688,869, incorporated herein by reference. Of course, the cover compositions are not limited in any way to those compositions set forth in said copending applications.

The high acid ionomers suitable for use in the preferred embodiment low-spin golf balls are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins included in the cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the cover composition preferably includes a high acid ionomeric resin and the scope of the patent embraces all known high acid ionomeric resins falling within the parameters set forth above, only a relatively limited number of these high acid ionomeric resins are currently available. In this regard, the high acid ionomeric resins available from E.I. DuPont de Nemours Company under the trademark "Surlyn®", and the high acid ionomer resins available from Exxon Corporation under the trademark "Escor®" or tradename "Iotek" are examples of available high acid ionomeric resins which may be utilized in the present invention.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly (ethylene acrylic acid) and the "Surlyn®" resins are zinc, sodium, magnesium, etc. salts of poly(ethylene methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® AD-8422 offers the following general properties when compared to Surlyn® 8920 the stiffest, hardest of all on the low acid grades (referred to as "hard" ionomers in U.S. Pat. No. 4,884,814, incorporated herein by reference):

| | LOW ACID (15 wt % Acid) | HIGH ACID (>20 wt % Acid) | |
|---|---|---|---|
| | SURLYN ® 8920 | SURLYN ® 8422-2 | SURLYN ® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP[1], ° C. | 88 | 86 | 85 |
| FP, ° C. | 47 | 48.5 | 45 |
| COMPRESSION MOLDING[2] | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn®) SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows:

| Surlyn ® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Examples of the high acid acrylic acid based ionomers suitable for use in the present invention include the Escor® or Iotek high acid ethylene acrylic acid ionomers produced by Exxon. In this regard, Escor® or Iotek 959 is a sodium ion neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR ® (IOTEK) 959 | ESCOR ® (IOTEK) 960 |
| --- | --- | --- |
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Furthermore, as a result of the development by the inventors of number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce cover compositions exhibiting enhanced hardness and resilience due to synergies which occur during processing. Consequently, the metal cation neutralized high acid ionomer resins recently produced can be blended to produce substantially harder covered golf balls having higher C.O.R.'s than those produced by the low acid ionomer covers presently commercially available.

More particularly, several new metal cation neutralized high acid ionomer resins have been produced by the inventors by neutralizing, to various extents, high acid copolymers of an alpha-olefin and an alpha, beta-unsaturated carboxylic acid with a wide variety of different metal cation salts. This discovery is the subject matter of U.S. application Ser. No. 07/901,660, filed Jun. 19, 1992, now having matured into U.S. Pat. No. 5,688,869 incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the covers of the preferred embodiment low-spin golf balls of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the preferred embodiment balls of the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylenelmethacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the "Primacor" designation. These high acid base copolymers exhibit the typical properties set forth below in Table 6.

TABLE 6

Typical Properties of Primacor Ethylene-Acrylic Acid Copolymers

| GRADE ASTM | PERCENT ACID | DENSITY, g/cc D-792 | MELT INDEX, g/10 min D-1238 | TENSILE YD. ST (psi) D-638 | FLEXURAL MODULUS (psi) D-790 | VICAT SOFT PT (° C.) D-1525 | SHORE D HARDNESS D-2240 |
|---|---|---|---|---|---|---|---|
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C.

Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 7, and more specifically in Example 1 in U.S. application Ser. No. 07/901,660, filed Jun. 19, 1992, now having matured into U.S. Pat. No. 5,688,869, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 7

| Formulation No. | Wt-% Caton Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |
| 23(MgO) | 2.91 | 53.5 | 2.5 | .813 | |
| 24(MgO) | 3.85 | 71.5 | 2.8 | .808 | |
| 25(MgO) | 4.76 | 89.3 | 1.1 | .809 | |
| 26(MgO) | 1.96 | 35.7 | 7.5 | .815 | |
| 27(NiAc) | 13.04 | 61.1 | 0.2 | .802 | 71 |
| 28(NiAc) | 10.71 | 48.9 | 0.5 | .799 | 72 |
| 29(NiAc) | 8.26 | 36.7 | 1.8 | .796 | 69 |
| 30(NiAc) | 5.66 | 24.4 | 7.5 | .786 | 64 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness
Control for Formulations 23–26 is 50/50 Iotek 8000/7030,
C.O.R. = .814, Formulation 26 C.O.R. was normalized to that control accordingly
Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in golf ball cover construction, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451, and the recently produced high acid blends disclosed in U.S. Pat. No. 5,688,869, all of which, as previously noted, are herein incorporated by reference.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for golf ball production. By using these high acid ionomer resins harder, stiffer golf balls having higher C.O.R.s, and thus longer distance, can be obtained.

As will be further noted, other ionomer resins may be used in the cover compositions, such as low acid ionomer resins, so long as the molded cover produces a Shore D hardness of 65 or more. Properties of some of these low acid ionomer resins are provided in the following table:

| Typical Properties of Low Acid Escor ® (Iotek) Ionomers | | | | | | |
|---|---|---|---|---|---|---|
| Resin Properties | ASTM Method | Units | 4000 | 4010 | 8000 | 8020 |
| Cation type | | | zinc | zinc | sodium | sodium |
| Melt index | D-1238 | g/10 min. | 2.5 | 1.5 | 0.8 | 1.6 |
| Density | D-1505 | kg/m³ | 963 | 963 | 954 | 960 |
| Melting Point | D-3417 | ° C. | 90 | 90 | 90 | 87.5 |
| Crystallization Point | D-3417 | ° C. | 62 | 64 | 56 | 53 |
| Vicat Softening Point | D-1525 | ° C. | 62 | 63 | 61 | 64 |
| % Weight Acrylic Acid | | | 16 | — | 11 | — |
| % of Acid Groups Cation Neutralized | | | 30 | — | 40 | — |
| (3 mm thick, compression molded) | | | | | | |
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |
| Resin Properties | ASTM Method | Units | 8030 | 7010 | 7020 | 7030 |
| Cation type | | | sodium | zinc | zinc | zinc |
| Melt Index | D-1238 | g/10 min. | 2.8 | 0.8 | 1.5 | 2.5 |
| Density | D-1505 | kg/m³ | 960 | 960 | 960 | 960 |
| Melting Point | D-3417 | ° C. | 87.5 | 90 | 90 | 90 |
| Crystallization Point | D-3417 | ° C. | 55 | — | — | — |
| Vicat Softening Point | D-1525 | ° C. | 67 | 60 | 63 | 62.5 |
| % Weight Acrylic Acid | | | — | — | — | — |
| % of Acid Groups Cation Neutralized | | | — | — | — | — |
| (3 mm thick, compression molded) | | | | | | |
| Tensile at Break | D-638 | MPa | 28 | 38 | 38 | 38 |
| Yield Point | D-638 | MPa | 23 | | none | none |
| Elongation at Break | D-638 | % | 395 | 500 | 420 | 395 |
| 1% Secant modulus | D-638 | MPa | 390 | — | — | — |
| Shore Hardness D | D-2240 | — | 59 | 57 | 55 | 55 |

In addition to the above noted ionomers, compatible additive materials may also be added to produce the cover compositions of the present invention. These additive materials include dyes (for example, Ultramarine Blue sold by Whitaker, Clark, and Daniels of South Painsfield, N.J.), and pigments, i.e. white pigments such as titanium dioxide (for example Unitane 0–110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, herein incorporated by reference, may also be included in the cover composition of the invention. Examples of suitable optical brighteners which can be used in accordance with this invention are Uvitex OB as sold by the Ciba-Geigy Chemical Company, Ardsley, N.Y. Uvitex OB is thought to be 2,5-Bis(5-tert-butyl-2-benzoxazoly)thiophene. Examples of other optical brighteners suitable for use in accordance with this invention are as follows: Leucopure EGM as sold by Sandoz, East Hanover, N.J. 07936. Leucopure EGM is thought to be 7-(2n-naphthol (1,2-d)-triazol-2yl)-3phenyl-coumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(benzoxaczoly)stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with an ionomer to be used in the cover composition to provide a masterbatch (M.B.) of desired concentration and an amount of the masterbatch sufficient to provide the desired amounts of additive is then admixed with the copolymer blends.

The above cover compositions, when processed according to the parameters set forth below and combined with cores as described herein, at thicknesses defined herein to produce covers having a Shore D hardness of 65, provide golf balls with reduced spin rates. It is noted, however, that the high acid ionomer resins provide for more significant reduction in spin rate than that observed for the low acid ionomer resins.

The cover compositions and molded balls of the present invention may be produced according to conventional melt blending procedures. In this regard, the ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about the soft cores to produce a golf ball having a diameter of about 1.680 inches or greater and weighing about 1.620 ounces. In an additional embodiment of the invention, larger molds are utilized to produce the thicker covered oversized golf balls.

Preferably, the preferred embodiment covers utilized in the low spin, dual core golf balls of the present invention have the following thicknesses:

| Cover Thickness | Preferred | Most Preferred |
|---|---|---|
| - Max. | 0.090" | 0.065" |
| - Min. | 0.040" | 0.055" |

In an alternative embodiment, the resulting ball is larger than the standard 1.680 inch golf ball. Its diameter is in the range of about 1.680 to 1.800 inches, more likely in the range of about 1.700 to 1.800 inches, preferably in the range of 1.710–1.730 inches, and most preferably in the range of about 1.717–1.720 inches. The larger diameter of the golf ball results from the cover thickness which ranges from more than the standard 0.0675 inches up to about 0.130, preferably from about 0.0675 to about 0.1275 inches, more preferably in the range of about 0.0825 to 0.0925 inches, and most preferably in the range of about 0.0860 to 0.0890 inches. The core is of a standard size, roughly about 1.540 to 1.545 inches.

As indicated, the preferred embodiment low-spin golf balls of the present invention can be produced by forming covers consisting of the compositions of the invention around the relatively soft cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451, which as previously noted, is herein incorporated by reference.

In a particularly preferred embodiment of the invention, the golf ball has a dimple pattern which provides coverage of 65% or more. The golf ball typically is coated with a durable, abrasion-resistant, relatively non-yellowing finish coat.

The invention has been described with reference to the preferred embodiments. Obviously, modifications and alterations will occur to others upon a reading and understanding of the preceding detailed description. Moreover, features and aspects of any of the preferred embodiments described herein may be combined with any other features and aspects of any other preferred embodiment described herein. It is intended that the invention be construed as including all such alterations and modifications insofar as they come within the scope of the appended claims or the equivalents thereof.

Having thus described the invention, it is claimed:

1. A low spin golf ball comprising:
   a molded dual core having a center component and a core layer disposed about said center component, said dual core having a Riehle compression of at least about 75; and
   a cover having a Shore D hardness of at least about 65 disposed on said dual core;
   wherein said center component comprises a thermoplastic material, and said core layer comprises a thermoplastic material.

2. The low spin golf ball of claim 1 wherein said cover comprises
   a high acid ionomer resin comprising a copolymer of greater than 16% by weight of an alpha, beta-unsaturated carboxylic acid, and
   an alpha olefin of which about 10% to about 90% of the carboxyl groups of the copolymer are neutralized with a metal cation.

3. The low spin golf ball of claim 1 wherein said golf ball has a diameter of about 1.717 to about 1.720 inches.

4. The low spin golf ball of claim 1 wherein said cover is comprised of at least one high acid ionomer resin comprising a copolymer of greater than 16% by weight of an alpha, beta-unsaturated carboxylic acid, and an alpha olefin of which about 10 to about 90% of the carboxyl groups of the copolymer are neutralized with a metal cation.

5. The low spin golf ball of claim 1 wherein said cover has a thickness of at least about 0.0675 inches.

6. A low spin golf ball comprising:

a molded dual core having a center component and a core layer disposed about said center component, said dual core having a Reihle compression of at least about 75; and a cover having a Shore D hardness of at least about 65 disposed on said dual core;

wherein said center component comprises a thermoplastic material and said core layer comprises a thermoplastic material, and said thermoplastic material is selected from the group consisting of (i) polyurethane, (ii) polyester, (iii) polyamide, (iv) ionomer, (v) polycarbonate, (vi) polyether block amide, and (vii) combinations thereof.

7. A low spin golf ball comprising:

a dual core having a center component and a core layer disposed about said center component; and a multi-layer cover disposed on said dual core, said cover having a Shore D hardness of at least about 65, said cover including an inner cover layer and an outer cover layer, wherein said center component comprises a thermoplastic material and said core layer comprises a thermoset material.

8. The golf ball of claim 7 wherein said thermoset material comprises a material selected from the group consisting of (i) a diene-containing polymer, (ii) a metallocene catalyzed polyolefin that is crosslinked, (iii) a polyurethane, (iv) a silicone, (v) polyamide, (vi) a polyurea, and (vii) combinations thereof; and said thermoplastic material comprises a material selected from the group consisting of (i) an ionomer, (ii) a polyurethane, (iii) an elastomer, (iv) a polyetheramide, (v) a polyetherester, (vi) a metallocene catalyzed polyolefin, (vii) a styrene butadiene block copolymer, and (viii) combinations thereof.

9. A low spin golf ball comprising:

a dual core having a center component and a core layer disposed about said center component, said dual core having a coefficient of restitution (C.O.R.) of at least about 0.750; and A multi-layer cover disposed on said dual core, said cover having a Shore D hardness of at least about 65 said cover including an inner cover layer and an outer cover layer.

10. The low spin golf ball of claim 9 wherein said cover is comprised of at least one high acid ionomer resin comprising a copolymer of greater than 16% by weight of an alpha, beta-unsaturated carboxylic acid, and an alpha olefin of which about 10 to about 90% of the carboxyl groups of the copolymer are neutralized with a metal cation.

11. The low spin golf ball of claim 9 wherein said golf ball has a diameter of about 1.717 to about 1.720 inches.

12. The low spin golf ball of claim 9 wherein said center component comprises a thermoset material and said core layer comprises a thermoplastic material.

13. The golf ball of claim 9 wherein said center component comprises a thermoplastic material and said core layer comprises a thermoplastic material.

14. The low spin golf ball of claim 9 wherein said cover has a thickness of at least about 0.0675 inches.

15. A low spin golf ball comprising:

a dual core having a center component and a core layer disposed about said center component, said center component and said core layer comprising a thermoplastic material, said dual core having a Reihle compression of at least about 75; and a cover disposed on said dual core, said cover having a Shore D hardness of at least about 65, wherein said golf ball has a diameter of about 1.717 to about 1.720 inches.

16. The low spin golf ball of claim 15 wherein said cover is comprised of at least one high acid ionomer resin comprising a copolymer of greater than 16% by weight of an alpha, beta-unsaturated carboxylic acid, and an alpha olefin of which about 10 to about 90% of the carboxyl groups of the copolymer are neutralized with a metal cation.

17. The low spin golf ball of claim 15 wherein said cover has a thickness of at least about 0.0675 inches.

* * * * *